United States Patent [19]

Gauger

[11] Patent Number: 5,791,622
[45] Date of Patent: Aug. 11, 1998

[54] VEHICLE POWER SEAT ADJUSTER WITH FLEX CABLE GUIDES

[75] Inventor: Derek Gauger, Ann Arbor, Mich.

[73] Assignee: Lear Corporation, Southfield, Mich.

[21] Appl. No.: 674,538

[22] Filed: Jul. 2, 1996

[51] Int. Cl.[6] .................................................. F16M 13/00
[52] U.S. Cl. ........................... 248/430; 74/89.15; 464/52; 297/344.1
[58] Field of Search .................................. 248/394, 395, 248/429, 430; 297/344.1, 311; 74/500.5, 501.5, 89.15; 464/52, 53

[56] References Cited

U.S. PATENT DOCUMENTS

| | | |
|---|---|---|
| 4,448,381 | 5/1984 | Anspaugh et al. |
| 5,163,734 | 11/1992 | Hakansson .............. 74/89.15 |
| 5,292,178 | 3/1994 | Loose et al. |
| 5,316,258 | 5/1994 | Gauger et al. |
| 5,456,439 | 10/1995 | Gauger. |
| 5,467,957 | 11/1995 | Gauger ................... 74/89.15 |
| 5,642,965 | 7/1997 | Dos Reis et al. ........... 464/52 |

*Primary Examiner*—Peter M. Cuomo
*Assistant Examiner*—Gerald A. Anderson
*Attorney, Agent, or Firm*—Young & Basile

[57] ABSTRACT

Guide members are carried on a drive motor mounting bracket in a vehicle power seat adjuster and receive a flex drive shaft extending between the drive motor and a lead screw mounted in the track assembly in a snap-in connection. The guide members stationarily support the flex drive cable from movement and are formed of a pair of spaced legs. Inner surfaces of the legs have an arcuate shape to snap around and tightly engage the flex drive cable housing.

23 Claims, 3 Drawing Sheets

VEHICLE POWER SEAT ADJUSTER WITH FLEX CABLE GUIDES

BACKGROUND OF THE INVENTION

The present invention relates to vehicle seat adjusters.

DESCRIPTION OF THE ART

Power seat adjusters are a popular option on many automotive vehicles and are frequently offered as standard equipment on higher priced vehicles. Such power seat adjusters are primarily used on the driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slidably mounted on a lower track anchored to the vehicle floor. A drive mechanism typically includes a bi-directional electric motor which rotates a pair of drive shafts extending outward from the motor to a gear assembly or box mounted on each upper track. Typically, each gear box engages a lead screw extending longitudinally below each upper track. A drive block is fixedly mounted to each lower track and threadingly receives the lead screw to cause reciprocal, horizontal movement of the upper track and the attached seat support frame upon selective energization of the drive motor.

Similar drive mechanisms are provided for vertical (up and down) adjustment of the seat support frame and, in a seat adjuster having a seat recliner adjustment mechanism, for angularly adjusting the position of the seat back with respect to the seat bottom. The vertical drive mechanism may also include separate front and rear edge drive mechanisms for selectively tilting the front and rear edges of the seat bottom independent of each other as well as simultaneously to raise and lower the entire vehicle seat or, in some applications, only the seat bottom or cushion.

Each vertical and recliner drive mechanism also includes a drive motor having a rotatable output shaft connected to a gear assembly either directly in the case of the front and rear vertical drive mechanisms or by means of two shafts extending from a single motor to separate gear assemblies mounted on each upper track or on the seat support frame in the case of a seat recliner drive mechanism.

The various drive motors, particularly the horizontal drive motor and the seat recliner drive motor, are typically mounted on a motor mounting bracket which extends between and is joined at one or opposite ends to the movable upper track(s) of the track assembly.

Further, in order to span the many possible mounting locations of the horizontal or seat recliner drive motors on the seat adjuster, it is now common to employ flexible drive cables formed of a rotating cable coupled at opposite ends to the drive motor or motor gear box and the lead screw gear box. The rotating cable is surrounded by a stationary, flexible outer sheath or cover. A special retention device, such as a ferrule, is employed at each end of the flex cable housing cover to secure the cover to the respective gear box or motor.

While the use of flex drive cables has proven to be enormously beneficial in the design and operation of vehicle power seat adjusters, the use of such flex cables has introduced different problems and objections into operation of power seat adjusters. Since the interior cable within the flex cable rotates at a high speed, the entire flex cable and surrounding cover vibrates which creates objectionable noise, particularly if the cable housing strikes adjacent seat adjuster structure. Assembly of the flex cable is also time consuming due to the need for the special retention device or ferrule to secure the flex cable cover to the gear boxes or motor. Further, since the flex drive cables are typically exposed beneath the seat adjuster, the flex drive cable is easily grabbed which could result in damage to the flex cable and associated end connections.

Thus, it would be desirable to provide a power seat adjuster which overcomes the problems associated with previously devised power seat adjusters utilizing flex drive cables. It would also be desirable to provide a power seat adjuster having unique means which reduce vibration and objectionable noise caused by rotation of the flex cables, which simplifies the assembly of the flex cables, and which eliminates the need for special retention devices for the flex cable cover thereby resulting in cost savings in manufacturing a power seat adjuster.

SUMMARY OF THE INVENTION

The present invention is a unique flex cable guide means for use in power seat adjuster having flex drive cables extending from a drive motor to a rotative connection with a lead screw.

In a preferred embodiment, the vehicle power seat adjuster includes first and second spaced track assemblies, each formed of a first component movable relative to a second, fixed component; a drive motor having at least one rotatable output shaft; a lead screw operatively coupled to first and second components; a flexible drive cable coupled between the motor output shaft and the lead screw; and guide means, carried on the power seat adjuster, for fixedly receiving the flexible drive cable(s).

The guide means are disposed between opposite ends of each flex drive cable. Preferably, each guide means has a generally U-shape formed of two spaced legs which are joined to a bracket at a lower end or to an end wall. The legs are spaced apart a distance sufficient to securely and stationarily receive a flex drive cable housing therein in a snap-in connection.

A plurality of guide means are provided for each flex drive cable and are spaced apart along the length of the drive cable. Preferably, an endmost guide means is disposed adjacent to the end connection of the flex drive cable to a gear box to coaxially align the flex drive cable with the connection in the gear box or motor which receives the flex drive cable.

The drive motor is supported by a motor mounting bracket extending between the track assemblies and fixedly joined to one or both inner tracks. The guide means, in one embodiment, are integrally formed as a one-piece, molded part of the motor mounting bracket. Alternately, guide means may comprise separate members individually attached to the motor mounting bracket.

The guide means of the present invention overcomes several problems associated with the prior use of flex drive cables in vehicle power seat adjusters. The guide means securely and non-movably retain the flex drive cables in a stationary position thereby eliminating vibration of the outer cover of the flex drive cable caused by high speed rotation of the interior core of the flex drive cable. Objectionable noise in the drive system is minimized since the guide means enable mass vibration damping by directly connecting any vibrations in the motor and flex drive cable to the more massive motor mounting bracket. The guide means also eliminates any possibility that a vibrated flex drive cable housing will contact adjacent seat adjuster structures. In addition, the guide means provides a simple and expeditious means of mounting the flex drive cable on a vehicle power seat adjuster which simplifies manufacturing and reduces assembly time and cost. The guide means also ensures that the flex drive cables do not hang loosely in the open space beneath the power seat adjuster. The guide means also ensures that the ends of the flex drive cable are coaxially aligned with the respective gear boxes or other end connection devices. This eliminates the need for special retention devices previously used to securely attach the ends of the outer cover of the flex drive cable to a gear box. Finally, the guide means prevent twisting of the flex drive cables and, in particular, curved flex cables, under high torque loads if the seat adjuster hits a hard stop.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
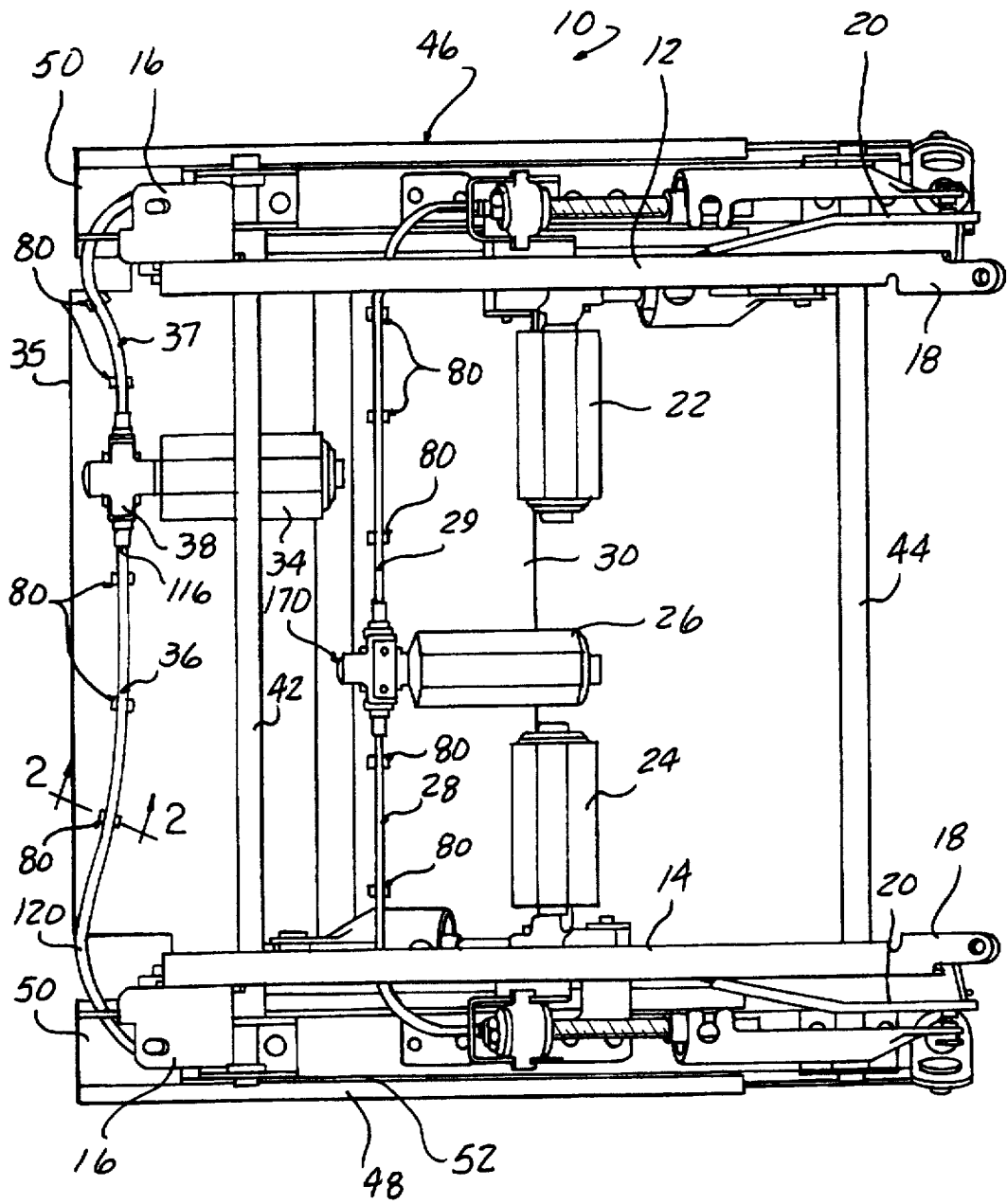
FIG. 1 is a plan view of a vehicle power seat adjuster employing flex drive cable guide means constructed in accordance with the teachings of the present invention.

Referring now to the drawing, and to FIG. 1 in particular, there is illustrated an exemplary power seat adjuster 10 which variably positions an automotive vehicle seat in any occupant selected position. The power seat adjuster 10 is a so-called "eight-way" adjuster providing horizontal fore/aft, vertical up and down, independent movement of each of the front and rear edges of the adjuster, as well as pivotal tilting of the seat back with respect to the seat bottom. It will be understood, however, that the present invention described hereafter is employable with a power seat adjuster which includes only one of such movements or adjustments, such as a horizontal fore/aft movement by itself or in combination with any number of the other such movements described above, each of which can also be used separately. It will also be understood that power seat adjusters having a different configuration from that shown in FIG. 1 may also employ the guide means of the present invention.

As is conventional, the power seat adjuster 10 supports a conventional vehicle seat, not shown, which includes a seat bottom or cushion and a seat back. An upper seat support frame is provided on the power seat adjuster 10 for supporting and connecting the seat bottom and the seat back to the power seat adjuster 10. The upper seat support frame includes a pair of spaced, longitudinally extending frame members or rails 12 and 14. Mounting brackets 16 are mounted on the front end and a mounting surface 18 is formed at the rear end of the frame members 12 and 14 to provide a mounting surface for connecting the seat bottom to the upper support frame. It will be understood that in lieu of the seat support frame members 12 and 14, suitable mounting brackets may be provided on the power seat adjuster 10 for direct attachment of a seat bottom of a vehicle seat to the power seat adjuster 10. A pair of seat back pivot brackets 20 are mounted on each of the seat support frame members 12 and 14 and provide a pivot connection to the seat back, not shown, to permit selective tilting or pivotal movement of the seat back with respect to the seat bottom as is typical in so-called "seat recliners".

Various drive assemblies are mounted on the power seat adjuster 10 to provide selective movement of the power seat adjuster along various axes. For example, front and rear vertical drive motors 22 and 24, respectively, are mounted on the power seat adjuster 10 and connected to conventional lead screws and drive blocks or nuts to independently elevate front and rear edges of the seat support frame members 12 and 14, respectively, and, thereby, to provide selective vertical adjustment of the front and rear edges of the vehicle seat. In addition, a seat back recliner drive motor 26 drives a pair of rotatable drive shafts 28 and 29, which are coupled to individual lead screws. Each lead screw is connected by a drive link to one of the seat back pivot brackets 20 mounted on opposite sides of the power seat adjuster 10 to provide selective pivotal adjustment of the seat back with respect to the seat bottom of a vehicle seat mounted on the seat support frame members 12 and 14.

The power seat adjuster 10 also includes a horizontal drive means formed of a bi-directional electric motor 34 which is supported by a motor mounting bracket 35 fixedly attached at opposite ends to each upper track of the power seat adjuster 10. A pair of rotatable drive shafts 36 and 37 extend outward from a gear assembly or box 38 integrally connected to the output shaft of the drive motor 34 to a rotatable connection with a lead screw disposed in each of a pair of opposed track assemblies 46 and 48.

The power seat adjuster 10 also includes front and rear tubular torsion tubes or rods 42 and 44, respectively, which extend between and are connected to opposed track assemblies denoted generally by reference numbers 46 and 48 to provide a rigid support structure for the power seat adjuster 10.

Each track assembly 46 and 48 includes a lower track 50 and an upper track 52. The upper track 52 is slidably coupled to the lower track 50 and is reciprocatingly, bi-directionally movable along the lower track 50 under the control of the horizontal drive means.

The horizontal drive motor 34 has a rotatable output shaft, not shown, which rotates in either of two directions depending upon the direction of current flow to the motor 34. The gear box 38 is integrally formed as part of the motor 34 and is connected to the output shaft of the motor 34. The gear box 38 converts rotation of the output shaft of the motor 34 to rotation of the two horizontal drive shafts 36 and 37. The gear means 38 may also be mounted separate from the motor 34 while still being coupled to the output shaft of the motor 34. A suitable gear reduction may be implemented by the gear means 38 so as to provide a low speed of rotation with high torque to the drive shafts 36 and 37.

Figure 2:
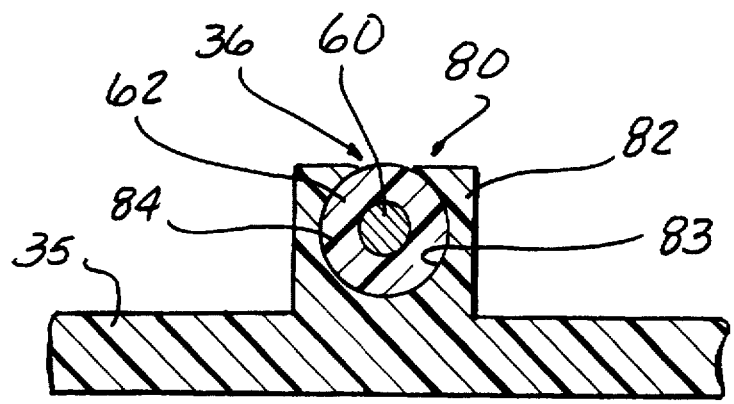
FIG. 2 is a cross-sectional view generally taken along line 2—2 in FIG. 1.

As shown more clearly in FIG. 2, each of the drive shafts 36 and 37 is preferably in the form of a flexible cable having a helical wound steel core 60 surrounded by a protective outer covering or sheath 62. Each flexible drive shaft 36 and 37, such as the flexible drive shaft 36, is formed with a first axial end 116 and a second axial end which are interconnected by an intermediate arcuate portion 120. The first axial end 116 of the drive shaft 36 is coupled to the gear means 38. The second axial end, not shown, of the drive shaft 36 is fixedly coupled to a driven shaft or lead screw as described in U.S. Pat. No. 5,456,439, the contents of which are incorporated herein by reference.

As shown in FIG. 1, the intermediate portion 120 of the drive shaft 36 interconnects the first and second axial ends, respectively thereof, with the first and second axial ends being disposed at any angular orientation with respect to each other. By way of example only, the first and second axial ends of the drive shaft 36 are disposed substantially perpendicular to each other. It will be understood that other angular orientations of the first and second axial ends of the drive shaft 36 may also be possible depending upon the mounting position of the horizontal drive motor 34 with respect to the driven shaft(s).

In this example of a power seat adjuster which is described in more detail in U.S. Pat. No. 5,456,439, the second axial end of the drive shaft 36 narrows down to a smaller diameter neck portion which has a square or D shape to slidably and non-rotatably fit within a complementary shaped bore formed in a necked down end portion at a first end of a driven shaft. Preferably, the driven shaft is a conventional, externally threaded lead screw extending along the track assembly 48.

A bearing block is mounted through an aperture formed in a top wall of the upper track 52 and extends through the upper track 52 into the interior space formed between the upper track 52 and the lower track 50. Enlarged flanges are formed on two ends of the bearing block and receive fasteners, such as rivets, which extend through each mounting flange into the top wall of the upper track 52 to fixedly mount the bearing block to the upper track 52. An internal, smooth bore extends through the bearing block and rotatably receives the fixed connection between the narrowed down necked portion at the second axial end of the drive shaft 36 and the neck portion at the first end of the lead screw or driven shaft.

Alternately, as shown in greater detail in U.S. Pat. No. 5,316,258, a separate gear assembly or box may be mounted on one end of the lead screw. The gear assembly or box includes a gear mounted on the end of the lead screw which is engaged by a worm gear mounted on the end of the drive shaft 36. In this manner, rotation of the drive shaft 36 results in simultaneous rotation of lead screw.

Although not shown in FIG. 1, a drive block is employed to transfer rotation of the driven shaft or lead screw to translation of the upper track 52 in a horizontal fore or aft direction with respect to the lower track 50 upon selective energization of the horizontal drive motor 34. A threaded bore extends through the drive block and threadingly engages the lead screw. The drive block is movably or fixedly mounted to the lower track 50. Since the lead screw, horizontal drive motor 34 and flex drive cable 36 are mounted to and movable with the upper tracks 52, rotation of the lead screw through the drive block results in horizontal fore and aft translation of the upper track 52 with respect to the lower track 50 in a conventional manner.

As shown in FIG. 1, and in greater detail in FIG. 2, unique flex drive cable guide means 80 are carried on the motor mounting bracket 35 and engage the flex drive cables 36 and 37 to immovably retain each flex drive cable 36 and 37 in a stationary position thereby eliminating excessive vibration of the flex drive cables 36 and 37 and objectionable noise resulting therefrom. As a preferred embodiment shown in FIG. 2, each cable guide means 80 is integrally formed as a molded part of the motor mounting bracket 35. This applies when the motor mounting bracket 35 is molded of a suitable plastic material.

It will be understood that the guide members 80 may be mounted on any structural component of the seat adjuster 10, not only on the motor mounting bracket. For example, the guide members 80 may be mounted or formed on the upper tracks, etc.

In this embodiment, the cable guide means 80 is in the form of a pair of spaced legs 82 and 84 which extend outward from the plane of the motor mounting bracket 35. The legs 82 and 84 are spaced apart a distance to tightly and immovably receive the flex cable 36 therein.

Figure 3:
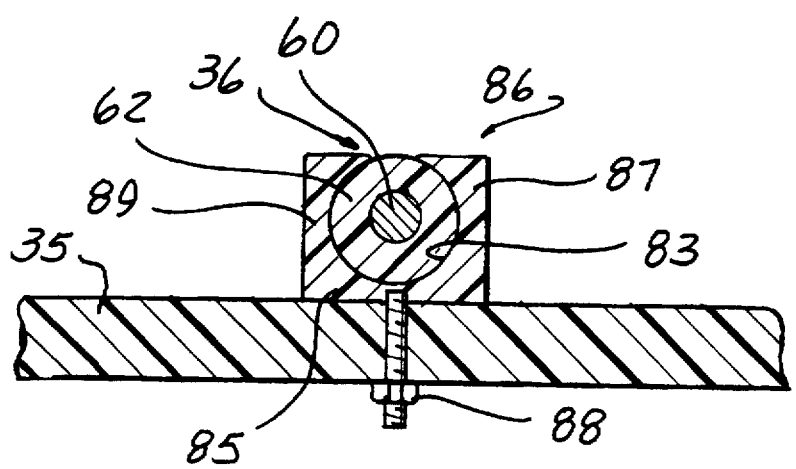
FIG. 3 is a cross-sectional view, similar to FIG. 2, but showing an alternate embodiment of the flex drive cable guide means of the present invention.

The exterior side surface of the legs 82 and 84 may have any shape such as planar, arcuate, etc. However, the inner surfaces 83 of the legs 82 and 84 and the portion of the motor mounting bracket 35 between the legs 82 and 84 have an arcuate shape, as shown in FIG. 3, forming a circle having a diameter conforming to the diameter of the generally cylindrical flex cable housing 62. Further, the upper facing edges of the legs 82 and 84 are spaced closer together than the diameter of the flex cable 36 to enable the flex cable 36 to be snapped-in to the guide member 80. Thus, the legs 82 and 84 bend outward when the flex drive cable 36 is inserted therebetween and then snap back around the flex cable 36. This simplifies assembly of the flex cables 36 and 37 on the power seat adjuster 10 while at the same time eliminating vibration and objectionable noise caused by rotation of the flex cables 36 and 37.

FIG. 3 depicts an alternate embodiment of the guide means, where the guide means 86 is in the form of a separate component which is fixedly mounted on the motor mounting bracket 35 by means of a fastener 88. In this embodiment, the guide means 86 also includes first and second spaced legs 87 and 89 which are joined at one end by a central lower end wall 85. The lower end wall 85 is disposed in registry with the motor mounting bracket 35 as shown in FIG. 3. The cable guide 86 is also suitable for use with a metal or other non-plastic motor mounting bracket 35. The inner surface 83 of the legs 87 and 89 and the end wall 85 have an arcuate shape to conform to the cylindrical exterior of the flex cable 36.

The number, spacing, and position of each of the guide means 80 or 86 on the motor mounting bracket 35 is selected to suit the requirements of a particular application. Specifically, the number of individual guides 80 will be dictated by the length of each flex cable 36, 37 which is dependent upon the lateral position of the drive motor 34 between the spaced track assemblies 46 and 48. For example, as shown in FIG. 1, the horizontal drive motor 34 is located closer to track assembly 46 than to the other track assembly 48. This makes one flex drive shaft, such as flex drive shaft 37, shorter than the drive shaft 36. As a result, additional guides 80 are used with the longer flex shaft 36 than with the flex shaft 37.

It is preferred that one guide means 80 be located as close as possible to each end connection of each flex cable 36 or 37 and the associated drive motor gear box 38 or lead screw gear box. This coaxially aligns the end of the flex cable 36 or 37 with the associated connector in the gear box to provide precise alignment of the flex cable and the gears in the gear box.

The unique guide means 80 of the present invention may also be used with the seat recliner drive structure of the power seat adjuster 10. The seat recliner drive motor 26 is typically located between the track assemblies 46 and 48 as shown in FIG. 1 and is mounted on a motor mounting bracket 30 attached to the upper tracks 52. The motor 26 has a rotatable output shaft, not shown, which is coupled to a gear means 170. Two seat recliner drive shafts 28 and 29 are coupled to the gear means 170 and extend outward from opposite sides of the gear means 170 to a connection with respective lead screws mounted in the track assemblies 48 and 46.

Each drive shaft 28 and 29 is identically constructed, except for possible length variations. Further details concerning the connection of each drive shaft 28 and 29 to a respective lead screw may be had by referring to U.S. Pat. No. 5,456,439.

The guide means 80 mounted on the motor mounting bracket 30 in the same as that described above for the horizontal drive motor 34 and horizontal drive cables 36 and 37. Guide means 80 are provided in an appropriate number and at an appropriate spacing to engage the seat recliner flex drive cables 28 and 29 and to retain such flex drive cables 28 and 29 in a fixed, non-moving position on the motor mounting bracket 30.

Figure 5:
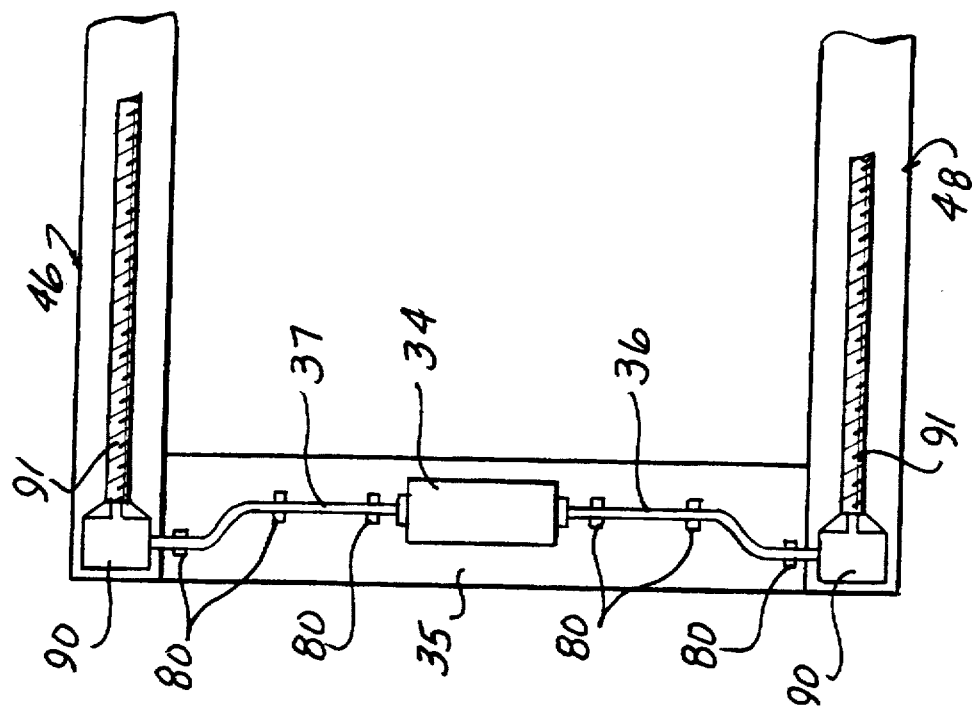
FIGS. 4 and 5 are partial plan views showing alternate uses of the flex cable drive means.
Figure 4:
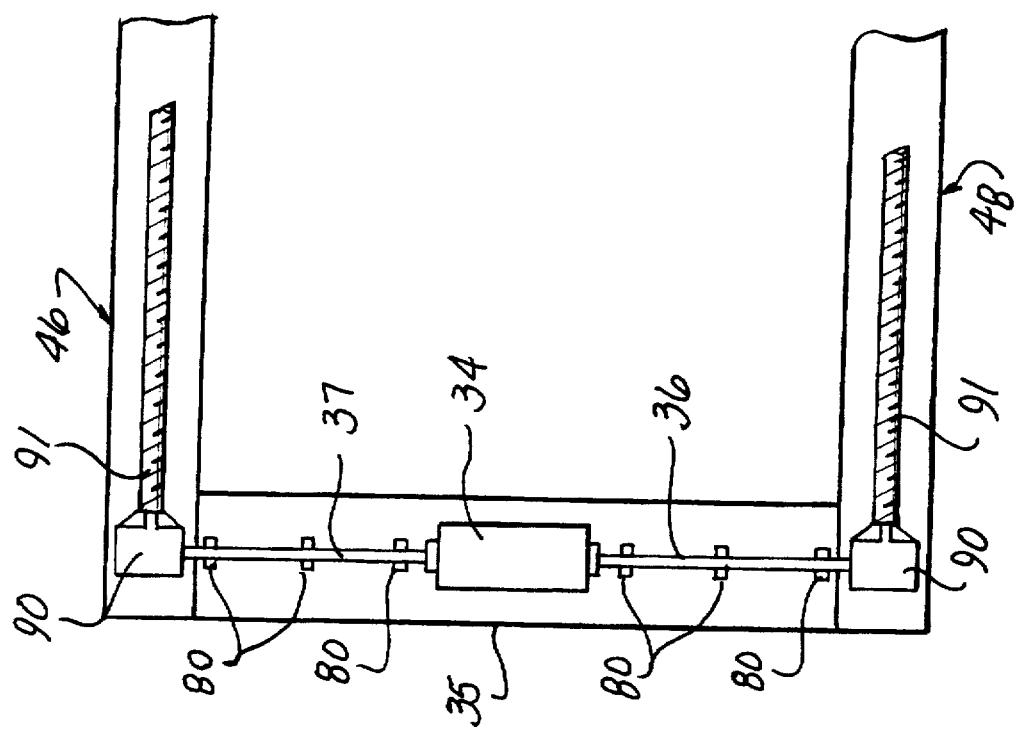

Alternate applications of the flex drive cable guide means 80 are depicted in FIGS. 4 and 5. FIGS. 4 and 5 both depict an alternate horizontal drive motor 34 configuration in which the horizontal drive motor 34 is mounted on a motor mounting bracket 35 extending between and joined to the opposed track assemblies 46 and 48. The two flex drive cables 36 and 37 extend co-axially outward from opposite ends of the drive motor 34. The opposite ends of each of the flex cables 36 and 37 are connected to a gear box or assembly 90 which is coupled to a horizontally extending lead screw 91.

In FIG. 4, the gear boxes 90 are generally coaxial with the motor 34 such that the flex cables 36 and 37 extend in a generally straight line between the drive motor 34 and each gear box 90. The guide means 80 are carried on the motor mounting bracket 35 in a generally straight line.

The power seat adjuster configuration shown in FIG. 5 is similar to that of FIG. 4 except that the motor 35 is offset from the gear boxes 90. In this configuration, each flex shaft 36 and 37 extends in a curved or sinuous path between the drive motor 34 and the respective gear box 90. The guide means 80 are also formed or mounted on the motor mounting bracket 35 at suitable locations to engage the curved extent of each flex cable 36 and 37. In this embodiment, as well as the embodiment shown in FIG. 4, and as in the preceding embodiment, a guide means 80 is located closely adjacent to each end of each flex drive cable 36 and 37 to provide co-axial alignment of the ends of the flex drive cables 36 and 37 with the respective end connections in the gear boxes 90 and the drive motor 34.

In summary, there has been disclosed a unique flex cable guide means for use in a power seat adjuster which eliminates certain deficiencies found in previous uses of flex drive cable in power seat adjusters. The guide means are integrally formed with or carried on certain drive motor mounting brackets and receive the individual flex drive cables in a snap-in connection. The guide means are provided in a suitable number and at a suitable spacing to non-movably hold the entire length of the flex drive cables on the motor mounting brackets The guide means also minimizes objectionable noise by damping vibrations in the motor and cable directly to the large motor mounting bracket. The guide means also ensures that the ends of the flex drive cables are coaxially aligned with the respective gear boxes or other end connections. At the same time, the guide means simplifies the assembly of the flex drive cables on the seat adjuster and eliminates the need for special retention devices previously required to fixedly hold the ends of the outer cover or sheath of each flex drive cable to the gear boxes. Finally, the guide means prevents twisting of curved flex cables under high torque loads.

What is claimed is:

1. A vehicle power seat adjuster comprising:
   first and second spaced track assemblies, each formed of a first component movable relative to a stationary, second component;
   a drive motor having at least one rotatable output shaft;
   a rotatable lead screw operatively coupled to the first and second components;
   a flexible drive cable coupled between the motor output shaft and the lead screw; and
   guide means, carried on the power seat adjuster, for fixedly and stationarily receiving the flexible drive cable.

2. The vehicle power seat adjuster of claim 1 wherein the guide means is disposed between opposed ends of the flex drive cable.

3. The vehicle power seat adjuster of claim 1 wherein the guide means comprises:
   a guide member formed of first and second spaced legs, the first and second legs spaced apart a distance to securely receive the flexible drive cable therebetween in a snap-in connection.

4. The vehicle power seat adjuster of claim 3 wherein:
   an inner surface of the first and second legs has an arcuate shape conforming to an exterior of the flex drive cable.

5. The vehicle power seat adjuster of claim 3 wherein:
   inner facing ends of the first and second legs are spaced closer together than an outer diameter of the flex drive cable such that the first and second legs bend apart as a flex drive cable is urged therebetween and move back to a normal position when the flex drive cable is fully inserted in the guide member.

6. The vehicle power seat adjuster of claim 3 wherein:
   the front and second legs have a generally planar form.

7. The vehicle power seat adjuster of claim 3 wherein:
   the first and second legs have an arcuate shape.

8. The vehicle power seat adjuster of claim 1 wherein the guide means comprises:
   a plurality of individual, spaced guide members.

9. The vehicle power seat adjuster of claim 1 further comprising:
   a motor mounting bracket fixedly connected to and extending between the first and second track assemblies, the motor mounting bracket supporting the drive motor; and
   the guide means carried on the motor mounting bracket.

10. The vehicle power seat adjuster of claim 9 wherein:
    the guide means is integrally formed as a one-piece, molded part of the motor mounting bracket.

11. The vehicle power seat adjuster of claim 9 wherein:
    the guide means is fixedly mounted on the motor mounting bracket.

12. The vehicle power seat adjuster of claim 1 further comprising:
    another rotatable lead screw operatively coupled to the first and second components in the other track assembly;

another flexible drive cable coupled between the motor output shaft and the another lead screw;

the guide means fixedly engaging the another flexible drive shaft.

13. The vehicle power seat adjuster of claim 1 further comprising:

a gear box coupled to the lead screw and the flexible drive cable, the guide means disposed between the gear box and the drive motor.

14. The vehicle power seat adjuster of claim 13 wherein the gear box comprises:

coupling means for receiving one end of the flexible drive cable; and wherein one of the guide means is disposed adjacent to the gear box for co-axial alignment of one end of the flexible drive cable with the coupling means in the gear box.

15. A vehicle power seat adjuster comprising:

first and second spaced track assemblies, each formed of a first component movable relative to a stationary, second component;

a drive motor having at least one rotatable output shaft;

a motor mounting bracket fixedly connected to and extending between the first and second track assemblies, the motor mounting bracket supporting the drive motor;

a rotatable lead screw operatively coupled to the first and second components in one of the first and second track assemblies;

a flexible drive cable coupled between the motor output shaft and the lead screw; and a plurality of guide members carried on the motor mounting bracket for fixedly and stationarily receiving the flexible drive cable.

16. The vehicle power seat adjuster of claim 15 wherein the guide members are spaced apart between posed ends of the flex drive cable.

17. The vehicle power seat adjuster of claim 15 wherein each guide member comprises:

first and second spaced legs, the first and second legs spaced apart a distance to securely receive the flexible drive cable therebetween in a snap-in connection.

18. The vehicle power seat adjuster of claim 17 wherein:

an inner surface of the first and second legs has an arcuate shape conforming to an exterior of the flex drive cable.

19. The vehicle power seat adjuster of claim 17 wherein:

inner facing ends of the first and second legs are spaced closer together than an outer diameter of the flex drive cable such that the first and second legs bend apart as a flex drive cable is urged therebetween and move back to a normal position when the flex drive cable is fully inserted in the guide member.

20. The vehicle power seat adjuster of claim 15 wherein:

the plurality of guide members are integrally formed as a one-piece, molded part of the motor mounting bracket.

21. The vehicle power seat adjuster of claim 15 wherein:

the plurality of guide members are fixedly mounted on the motor mounting bracket.

22. The vehicle power seat adjuster of claim 15 further comprising:

a gear box coupled to the lead screw and the flexible drive cable, the guide members being disposed between the gear box and the drive motor.

23. The vehicle power seat adjuster of claim 22 wherein the gear box comprises:

coupling means for receiving one end of the flexible drive cable; and wherein one of the guide members disposed adjacent to the gear box for co-axial alignment of one end of the flexible drive cable with the coupling means in the gear box.

* * * * *